United States Patent [19]

Bartholomew

[11] Patent Number: 4,541,658
[45] Date of Patent: Sep. 17, 1985

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 560,547

[22] Filed: Dec. 12, 1983

Related U.S. Application Data

[63] Continuation-in-part of Ser. No. 360,201, Mar. 22, 1982, , which is a continuation-in-part of Ser. No. 201,711, Oct. 29, 1980, Pat. No. 4,423,892.

[51] Int. Cl.4 .............................................. F16L 37/12
[52] U.S. Cl. ............................. 285/319; 285/DIG. 22
[58] Field of Search ............... 285/319, DIG. 22, 323, 285/DIG. 25, 281

[56] References Cited

U.S. PATENT DOCUMENTS

| | | | |
|---|---|---|---|
| 921,691 | 5/1909 | Friday | 285/DIG. 22 X |
| 1,542,421 | 6/1925 | Strongson | |
| 2,123,889 | 7/1939 | Gleason | |
| 2,441,344 | 5/1948 | Bosworth | 285/321 |
| 2,585,887 | 2/1952 | Woodward | 285/319 X |
| 3,314,696 | 4/1967 | Ferguson et al. | |
| 3,450,424 | 6/1969 | Calisher | |
| 3,453,005 | 7/1969 | Foults | |
| 3,534,988 | 10/1970 | Lindsey | |
| 3,538,940 | 11/1970 | Graham | |
| 3,574,359 | 4/1971 | Klein | |
| 3,584,902 | 6/1971 | Vyse | |
| 3,711,125 | 1/1973 | Dehar | 285/319 X |
| 3,718,350 | 2/1973 | Klein | |
| 3,724,882 | 4/1973 | Dehar | |
| 3,826,523 | 7/1974 | Eschbaugh | 285/319 X |
| 3,929,356 | 12/1975 | De Vincent et al. | |
| 3,929,357 | 12/1975 | De Vincent et al. | |
| 3,933,378 | 1/1976 | Sandford et al. | 285/319 |
| 3,980,324 | 9/1976 | Bouteille et al. | |
| 4,005,883 | 2/1977 | Guest | 285/322 |
| 4,009,896 | 3/1977 | Brewer | |
| 4,080,752 | 3/1978 | Burge | |
| 4,111,464 | 9/1978 | Asano et al. | |
| 4,123,089 | 10/1978 | Viero et al. | |
| 4,123,091 | 10/1978 | Cosentino et al. | |
| 4,128,264 | 12/1978 | Oldford | |
| 4,135,745 | 1/1979 | Dehar | 285/319 |
| 4,214,586 | 7/1980 | Mericle | 285/370 X |
| 4,219,222 | 8/1980 | Brusadin | 285/319 |
| 4,266,814 | 5/1981 | Gallagher | 285/319 |
| 4,423,892 | 1/1984 | Bartholomew | 285/305 X |

FOREIGN PATENT DOCUMENTS

| | | | |
|---|---|---|---|
| 2307154 | 8/1974 | Fed. Rep. of Germany | 285/319 |
| 2611233 | 9/1977 | Fed. Rep. of Germany | 285/319 |
| 2622269 | 11/1977 | Fed. Rep. of Germany | 285/308 |

Primary Examiner—Thomas F. Callaghan
Attorney, Agent, or Firm—Harness, Dickey & Pierce

[57] ABSTRACT

A quick connector assembly for use with tubular conduits is disclosed as comprising a housing having an axial bore for receiving one end of the conduit, an elastomeric ring-like seal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable portions which are adapted to snap over the annular projection upon insertion of the conduit into the housing bore. In one embodiment according to this invention, the retainer is assembled from two components, a first including a pair of yieldable legs which function to engage the housing and conduit, and a second forming a collar which locates the conduit and supports the seal.

26 Claims, 26 Drawing Figures

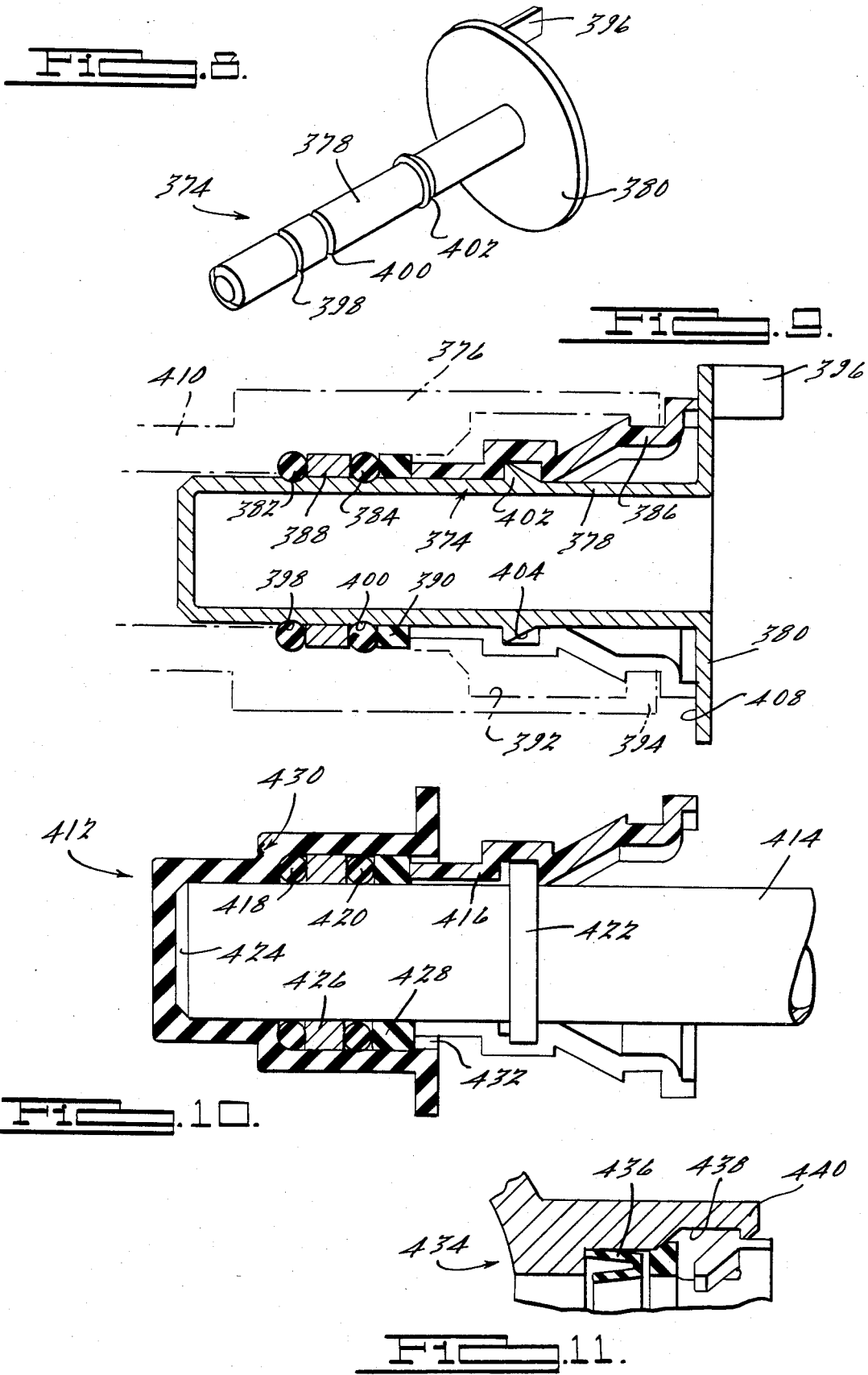

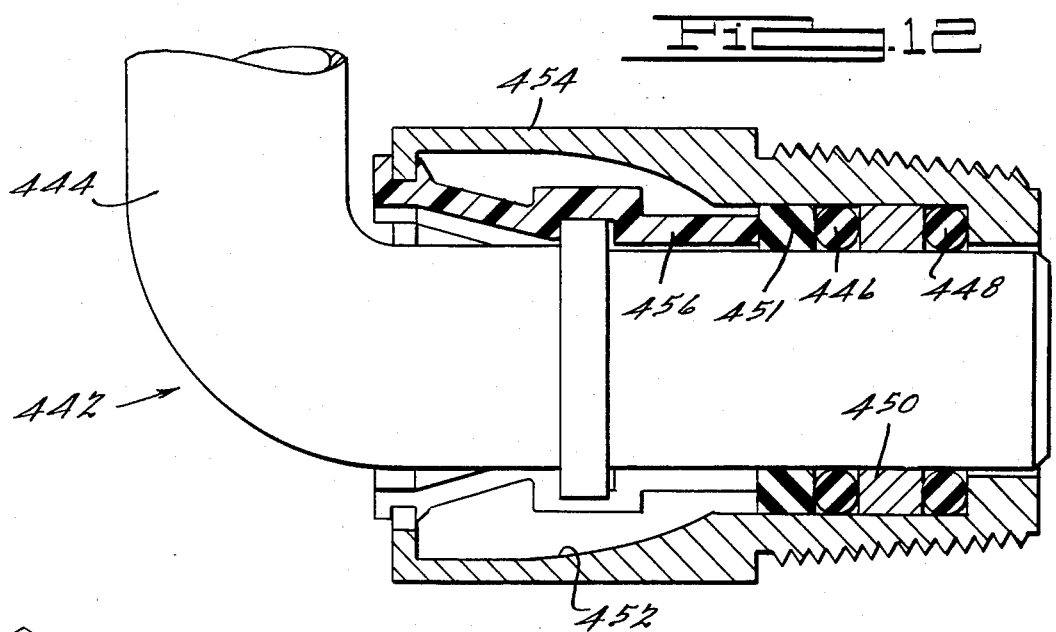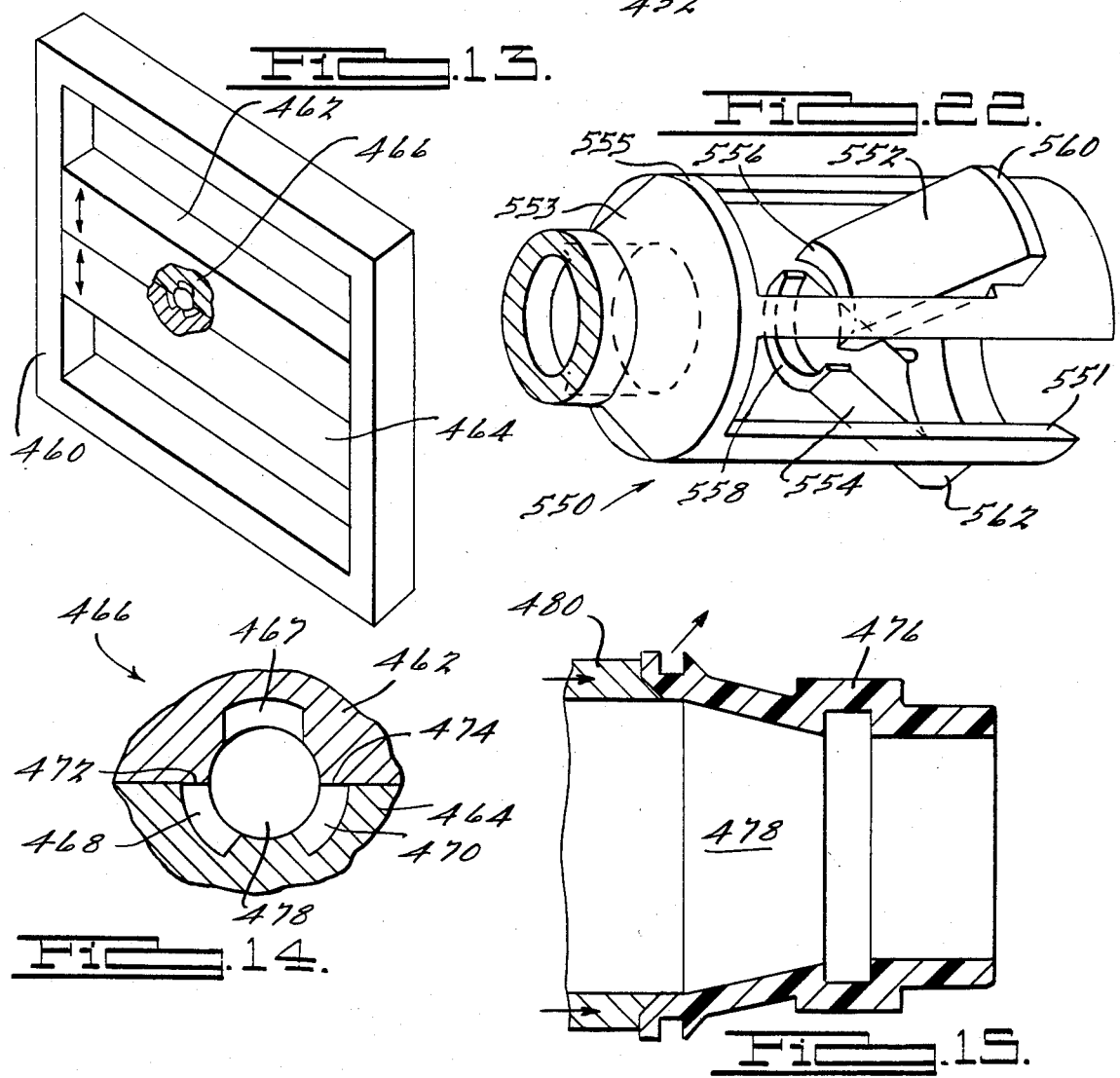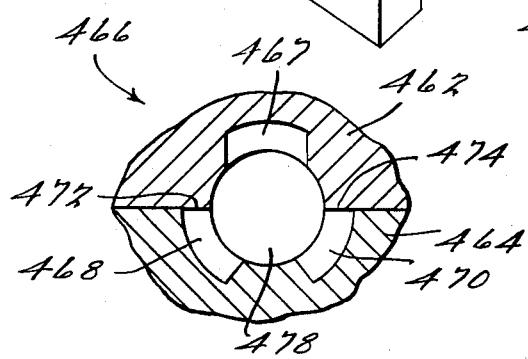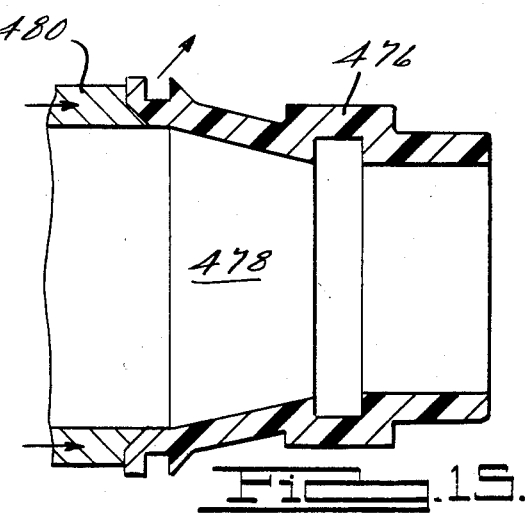

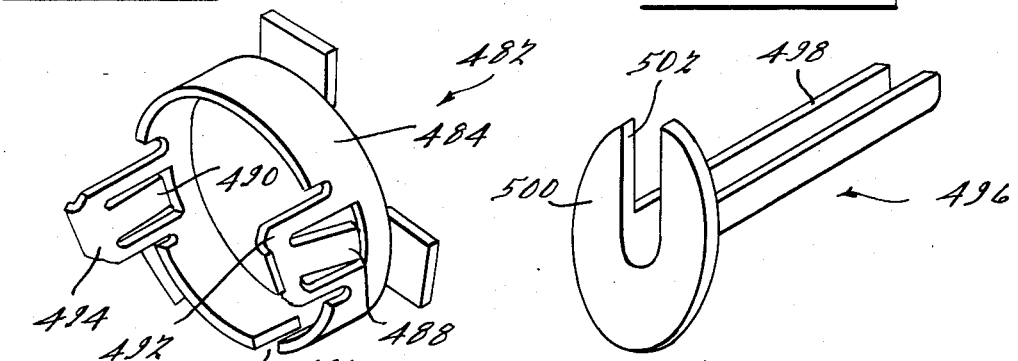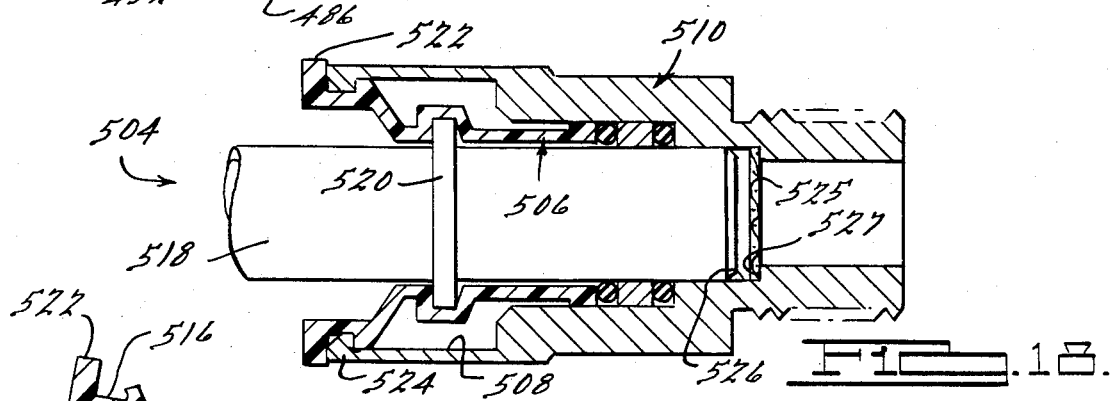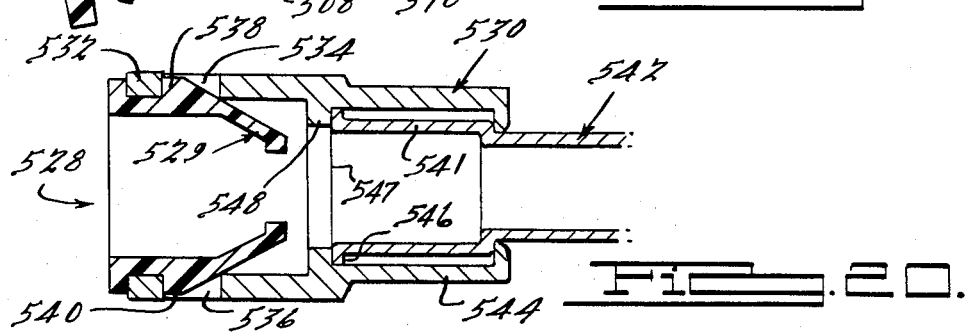

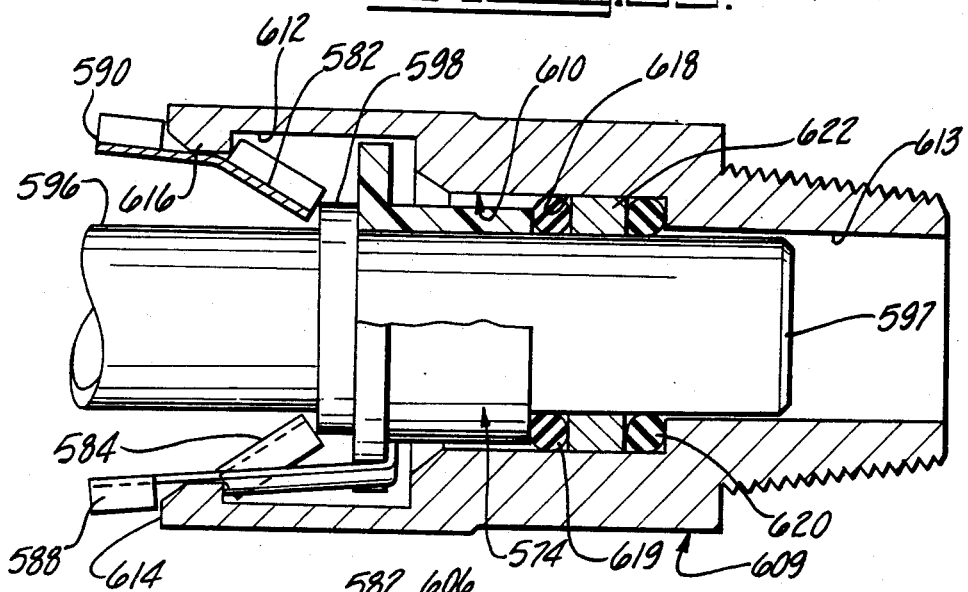
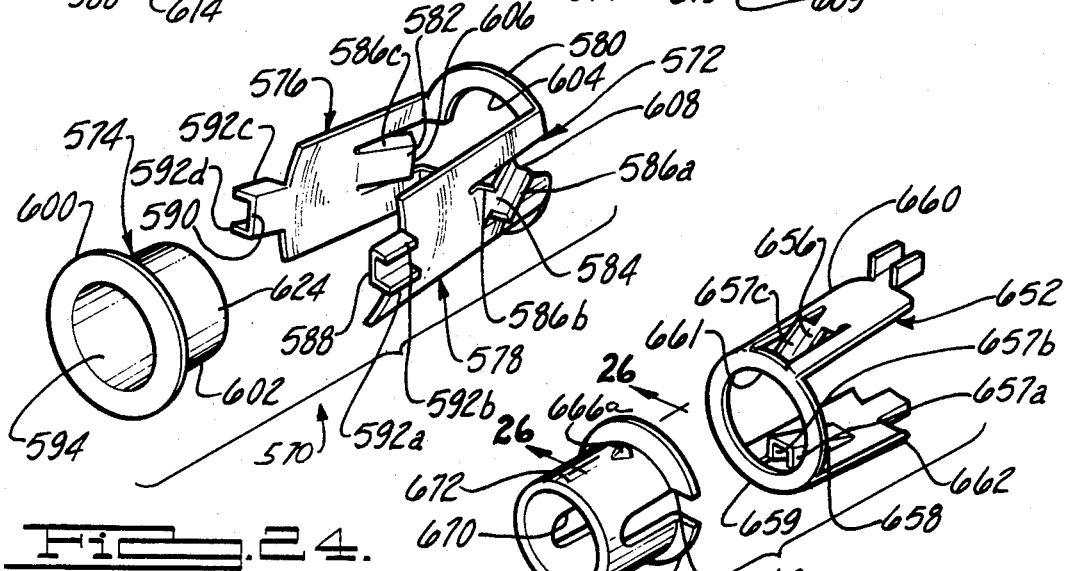
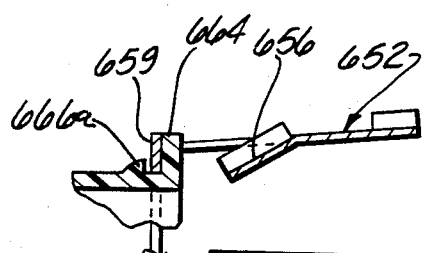

_4,541,658_

SWIVELABLE QUICK CONNECTOR ASSEMBLY

CROSS REFERENCE TO A RELATED APPLICATION

This application is a continuation-in-part of Application Ser. No. 360,201 filed Mar. 22, 1982, which is a continuation-in-part of Application Ser. No. 201,711 filed Oct. 29, 1980, now U.S. Pat. No. 4,423,892, both of which are hereby incorporated by reference.

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assemble components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

Another object of the present invention is to provide a connector assembly that may be employed to join dissimilar electrically conducting materials that would be otherwise subject to galvanic corrosion.

It is a further object of the present invention to provide a connector assembly which is adapted to provide for a bleed-down position when disconnecting a conduit from the housing of the connector assembly.

It is another object of the present invention to provide a pre-assembled connector conduit unit which requires only a one-step snapping connection to be joined to a connector housing.

It is yet another object of the present invention to provide a removable, disposable cover for protecting the pre-assembled connector conduit unit.

It is a further object of the present invention to provide a disposable stuffer-plug for the connector assembly which is adapted to install one or more sealing elements in an axial bore of the connector housing and detachably secure a retainer element to the connector housing, as well as to seal the axial bore of the connector housing.

It is still a further object of the present invention to provide an improved retainer element which operates to both secure the conduit in the axial bore of the housing and position the sealing element within the axial bore of the housing.

It is another object of the present invention to provide an improved retainer element formed with two or more leg members which operate to detachably secure the retainer element to the housing, the sealing means within the housing, the conduit in its operative position within the axial bore of the housing, and provide better resistance to off axis forces on the conduit.

It is a more specific object of the present invention to provide an improved retainer element formed from two separate assembled components, one forming two or more deformable legs and the second forming an annular collar.

To achieve the foregoing objects, the present invention provides a connector assembly which generally comprises a tubular conduit, a housing, sealing means, and retainer means. The tubular conduit is adapted to convey fluid and is formed with an annular projection disposed a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. In one embodiment, the retainer means is formed from two separate components, a latch and a bushing. The latch means includes two or more circumferentially spaced deflectable leg members. Each of the leg members of the latch means has radially outwardly projecting flanges portions which are adapted to receive the inwardly extending annular lip of the housing to secure the retainer means to the housing, and a radially inwardly projecting flange portions adapted to receive the annular projection of the conduit for securing the conduit in its operative position within the axial bore of the housing. The bushing member is affixed to the latch member and these components in combination retain the conduit within the housing and act to position the conduit relative to a sealing means.

Additional objects and advantages of the present invention will become apparent from reading of the detailed description of the preferred embodiments which makes reference to the following set of drawings:

BRIEF DESCRIPTION OF THE DRAWINGS

FIG. 8 is a perspective view of a stuffer-plug according to the present invention.

FIG. 9 is a side elevation view, partially in cross-section with the housing shown in phantom, of the stuffer-plug illustrated in FIG. 8 supporting the sealing and retainer elements.

FIG. 10 is a side elevation view, partially in cross-section, of a pre-assembled connector conduit unit according to the present invention protected by a removable, disposable cover.

FIG. 11 is a fractional side elevation view, partially in cross-section, of a connector assembly employing a U-cup sealing element.

FIG. 12 is a side elevation view, partially in cross-section of an elbow connector assembly according to the present invention.

FIG. 13 is a perspective view, partially in cross-section, of an apparatus for manufacturing the retainer element illustrated in FIGS. 3 and 4.

FIG. 14 is a fractional front elevation view of the manufacturing apparatus illustrated in FIG. 13.

FIG. 15 is a side elevation view, partially in cross-section, of a core body and ejector forming part of the apparatus of FIG. 13.

FIG. 16 is a perspective view of another embodiment of a retainer element.

FIG. 17 is a perspective view of a tool which may be used to assit the disconnection of the tubular conduit from the connector housing.

FIG. 18 is a side elevation view, partially in cross-section of another connector assembly according to the present invention.

FIG. 19 is a cross-sectional side elevation view of the connector assembly illustrated in FIG. 18, particularly showing the retainer element in a partially installed position.

FIG. 20 is a cross-sectional side elevation view of another connector assembly according to the present invention.

FIG. 21 is a cross-sectional side elevation view of the connector assembly illustrated in FIG. 20, particularly showing the connector housing.

FIG. 22 is a perspective view, partially in cross-section, of another embodiment of a connector housing, particularly featuring an integral retainer means.

FIG. 23 is a cross-sectional view of another embodiment of a retainer element composed of two assembled components.

FIG. 24 is an exploded perspective view of the retainer illustrated by FIG. 23 showing the constituent parts prior to their assembly.

FIG. 25 is an exploded perspective view of another embodiment of a retainer composed of two assembled components.

FIG. 26 is a partial sectional view of the retainer shown by FIG. 25 taken along line 26—26 of that Figure.

DETAILED DESCRIPTION OF THE PREFERRED EMBODIMENTS

U.S. Pat. No. 4,423,892, including FIGS. 1-14 and their corresponding description, is incorporated herein by reference.

Figure 1:
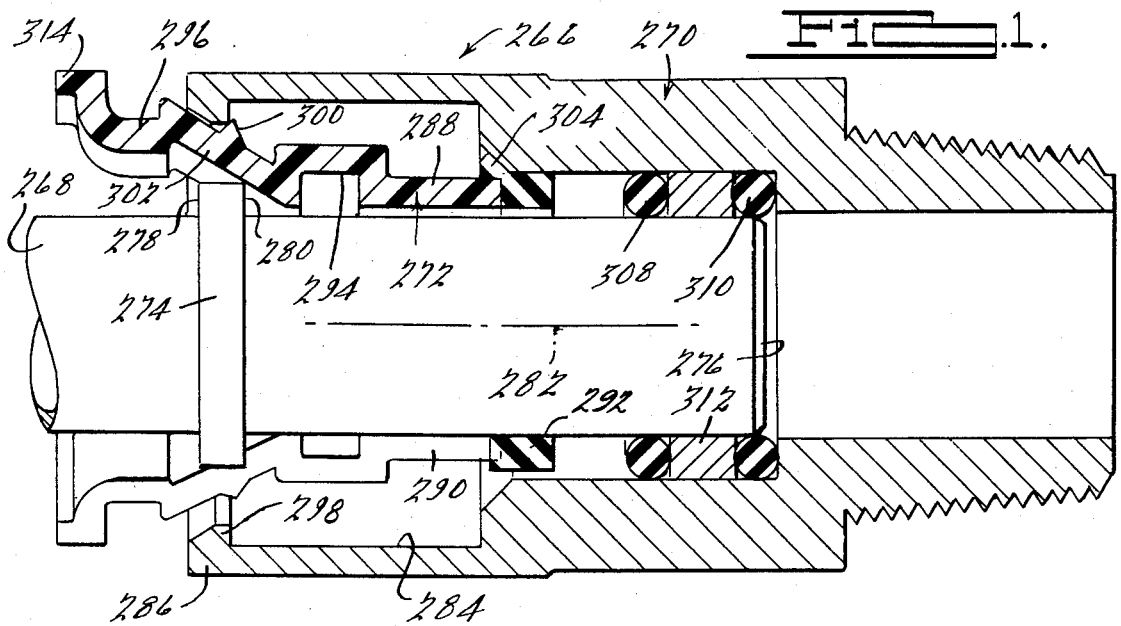
FIG. 1 is a side elevation view, partially in cross-section, of a connector assembly according to the present invention is a partially installed position.

Referring to FIG. 1, a side elevation view of a connector assembly 266 is shown, partially in cross-section, in a partially installed position. The connector assembly 266 includes a tubular conduit 268, a housing 270, and a retainer element 272. The conduit 268 is formed with an annular projection 274 disposed a predetermined lead distance from an end 276 of the conduit to be connected. It should be noted that the annular projection 274 is symmetrical in shape, in that the opposing surfaces 278 and 280 of the projection are generally transverse to a central axis 282 of the conduit 268 and generally parallel to each other.

The retainer element 272 is adapted to be disposed generally within an axial bore 284 of the housing 270 and is detachably secured to the housing at a first end 286 of the housing. The retainer serves to secure the conduit 268 in its operative position within the axial bore 284 of the housing 270 by cooperating with the annular projection 274 of the conduit. The retainer element 272 includes three circumferentially spaced resilient, deformable leg members, of which only two leg members 288 and 290 are shown in FIG. 1. These leg members extend from an integral collar member 292 at one end of the retainer element 272. The collar member 292 is adapted to provide an opening sufficient to permit the end 276 of the conduit to pass therethrough. Each of the leg members is formed with an inwardly opening channel portion 294 which is adapted to receive the annular projection 274 of the conduit 268 for securing the conduit in its operative position within the axial bore 284 of the housing 270. The shape of the inwardly opening channel portion 294 of the leg members is generally complimentary to the shape of the annular projection 274 of the conduit. Although various suitable shapes may be provided for the inwardly opening channel portion 294 and the annular projection 274, the shapes should be such as to lock the conduit into the axial bore 284 of the housing and prevent or limit axial movement of the conduit relative to the housing. Each of the leg members are also formed with an outwardly opening channel portion 296 which is adapted to receive an inwardly extending annular lip 298 of the housing to secure the retainer element 272 to the housing. The shape of the outwardly opening channel portion 296 of the leg members and the annular lip 298 of the housing are subject to the same considerations noted above for the inwardly opening channel portion 294 of the leg members and the annular projection 274 of the conduit 268. However, it may also be noted that rather than forming the annular lip 298 of the housing 270 by casting or milling, the annular lip may also be formed by rolling in the first end 286 of the housing.

Figure 2:
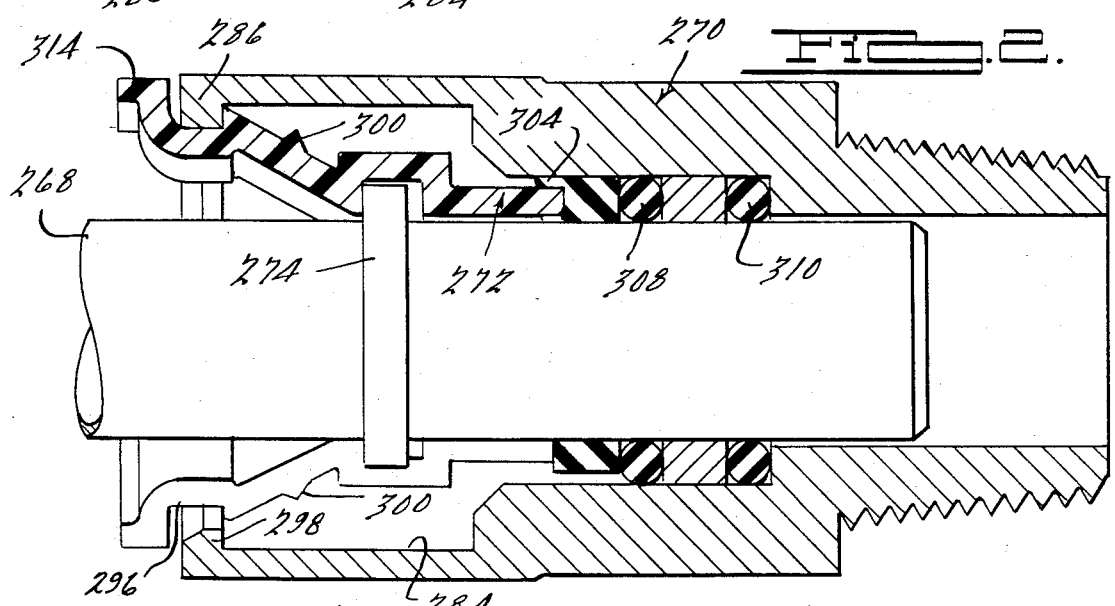
FIG. 2 is a side elevation view, partially in cross-section, of the connector assembly illustrated in FIG. 1 with the tubular conduit shown in its operative position in the axial bore of the housing.

The leg members (288, 290) of the retainer element 272 are adapted to deform in response to the insertion of the retainer element into the axial bore 284 of the housing 270 and permit the annular lip 298 of the housing to snap into the outwardly opening channel portion of each of the leg members. Similarly, the leg members of the retainer element 272 are adapted to deform in response to the insertion of the conduit 268 into the axial bore 284 of the housing 270 and through the collar member 292 of the retainer element 272, and permit the annular projection 274 of the conduit to snap into the inwardly opening channel portion 294 of the leg members. However, one feature of the connector assembly 266 is that the annular projection 274 of the conduit is adapted to snap into the inwardly opening channel portion 294 of the leg members (288, 290) before the annular lip 298 of the housing 270 snaps into the outwardly opening channel portion 296 of the leg members. This feature will permit the annular projection 274 of the conduit to easily snap into the inwardly opening channel portion 294 of the leg members. This feature is achieved by providing for two sets of tabs which cooperate to maintain the retainer element 272 in the partially installed position shown in FIG. 1 until the annular projection 274 of the conduit 268 has snapped into the inwardly opening channel portion 294 of the retainer element leg members. The first set of tabs 300 extend outwardly along an inclined portion 302 of the retainer element leg members, and operate to prevent the retainer element 272 from falling out of the axial bore 284 of the housing 270. One or more first tabs 300 may be provided on each of the retainer element leg members as may be appropriate in the particular application. The second set of tabs 304 are formed to extend generally outwardly from collar member 292. The second tabs 304 are shaped such that they will resist the further insertion of the retainer element 272 into the axial bore from the partially installed position until the annular projection 274 snaps into the inwardly opening channel portion 294 of the retainer element. However, once the conduit 268 is thus joined or united to the retainer element 272, the second tabs 304 will yield and deflect inwardly to permit the further insertion of the conduit 268 and the retainer element 272 into the axial bore 284 of the housing 270 until the annular lip 298 of the housing snaps into the outwardly opening channel portion 296 of each of the retainer element leg members and the conduit is in its operative position with the axial bore of the housing. FIG. 2 illustrates the connector assembly 266 with the conduit 268 shown in its operative position within the axial bore 284 of the housing 270.

The connector assembly 266 also includes two elastomeric rings 308 and 310 disposed within the axial bore 284 of the housing 270 for providing a fluid tight seal between confronting portions of the conduit 268 and the housing. The elastomeric rings are also separated by a suitable sleeve 312. It should be noted that once the conduit 268 is connected to the housing 270 via the retainer element 272, the conduit may be subsequently released and withdrawn from the axial bore 284 of the housing as follows. By manually deflecting each of the retainer element leg members at a finger portion 314 (extending out of the bore 284 of the housing) inwardly toward the central axis 282 sufficiently to disengage the annular lip 298 of the housing from the outwardly opening channel portion 296 of the leg members, the conduit 268 and the retainer element 272 will be permitted to slide out of the axial bore of the housing. It should be appreciated that the dimensions of the retainer element 272 and the housing 270 relative to the outer diameter of the conduit 268 should be such as to provide sufficient radial clearance between the retainer element and the conduit to permit the deflection of the retainer leg members necessary for the outwardly opening channel portion 296 to clear the annular lip 298 of the housing. Accordingly, it will be seen that the connector assembly 266 is adapted to readily permit subsequent disconnection of the conduit from the housing. One advantage of this feature of the present invention is that seals may be conveniently replaced without having to replace any of the other components of the connector assembly.

Figure 3:
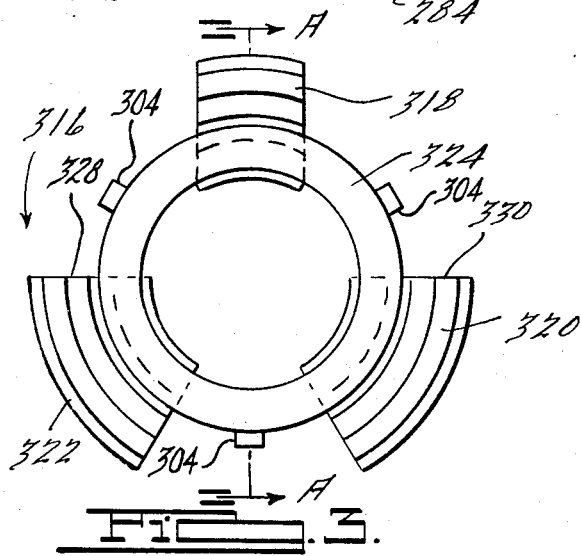
FIG. 3 is a front elevation view of an improved retainer element.
Figure 4:
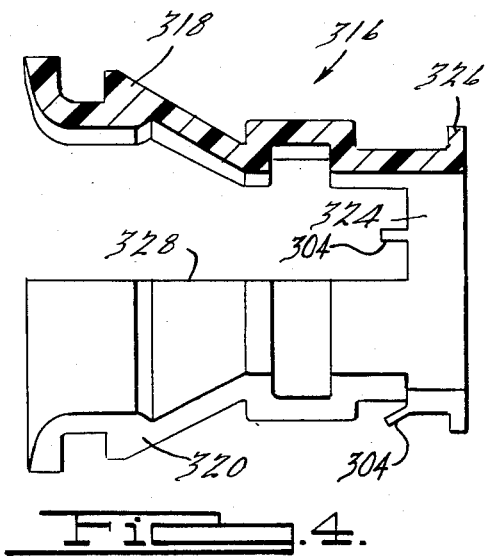
FIG. 4 is a side elevation view, partially in cross-section, of the retainer element illustrated in FIG. 3, taken along lines A—A.

Referring to FIGS. 3 and 4, a front and a side elevation view of a retainer element 316 is shown. Retainer element 316 is similar to the retainer element 272, in that it generally comprises three circumferentially spaced resilient, deformable leg members 318, 320 and 322, extending from an integral collar member 324 at one end thereof. However, as best illustrated in FIG. 4, the retainer element 316 includes an annular flange 326 extending outwardly from the collar member 324 for positioning the sealing element(s) within the axial bore of the connector housing. Since the flange 326 serves a principal function normally provided by a bushing, it should be appreciated that the need for the bushing may be eliminated in the appropriate application.

As may best be illustrated in FIG. 3, in one form of the present invention the leg members 318–320 are equally spaced circumferentially, and the opposing axially extending edges of any two of the leg members form a substantially straight line. For example, edge 328 of leg member 322 and edge 330 of leg member 320 form a horizontally-extending straight line. Thus, it may also be noted that any two of the leg members span a maximum of one hundred and eighty degrees (180°) (including the circumferential space between the leg members). It may also be noted that the provision of three leg members provides certain advantages in relation to a retainer element with either two or four leg members. For example, in order to disconnect a conduit from a housing, the finger portions of a three leg retainer element will be easier to grasp than a four leg retainer element. Additionally, a three leg retainer element will provide greater circumferential engagement than a two leg retainer element. Furthermore, with a two leg retainer element, a larger diameter connector housing will be required relative to a three leg retainer element in order to permit the leg members to expand around the annular projection of the conduit.

With respect to the materials from which retainer elements 272 and 316 may be constructed, flexible thermoplastic or metal spring stock which will withstand the temperature and chemical environment expected to be encountered in the application is preferred. For example, typical nylons which are considered to be useful are types 6, 6-6, 6-10, 6-12, 11 and 12. It may also be appropriate to add glass reinforcement up to 30% for increased strength in the particular application.

Figure 5:
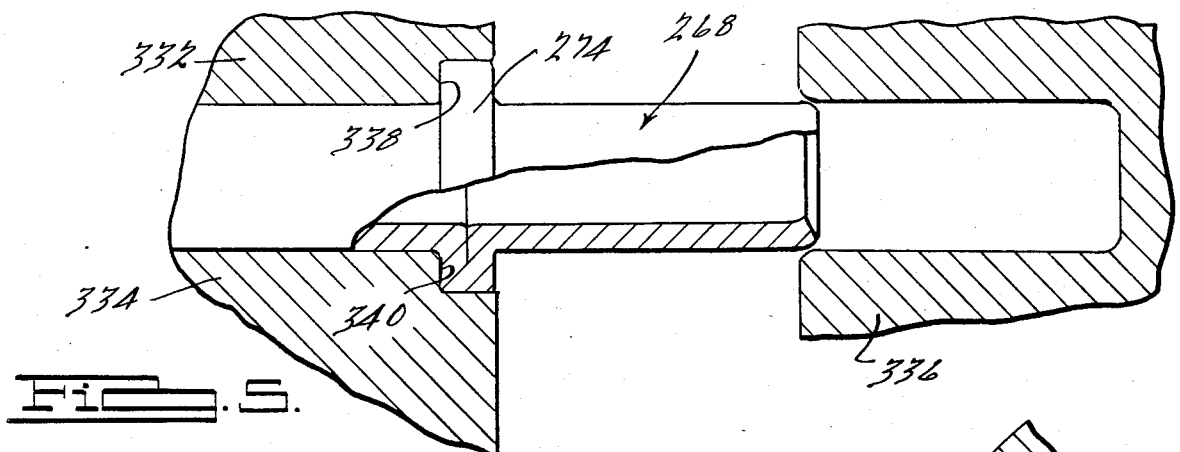
FIG. 5 is a side elevation view, partially in cross-section of the tubular conduit illustrated in FIGS. 1 and 2.

Referring to FIG. 5, a side elevation view of the tubular conduit 268 of FIG. 1 is shown, partially in cross-section. In particular, the conduit 268 is shown in relation to a set of forming dies 332, 334 and 336, which are used to form or coin the annular projection 274 of the conduit. Briefly, forming dies 332 and 334 clamp the conduit on one side of the projection to be formed, and the forming die 336 slides over or clamps the other side of the conduit. Then, as the forming die 336 is drawn into engagement with the forming dies 332 and 334, the conduit will buckle outwardly and conform itself to the shape of the recess 338 and 340 provided in the forming dies 332 and 334 respectively. It should be noted that this type of annular projection provides certain manufacturing advantages over previous projections having a sloping or tapered lead-in portion, including the use of higher forming forces and easier tolerances to maintain.

Figure 6:
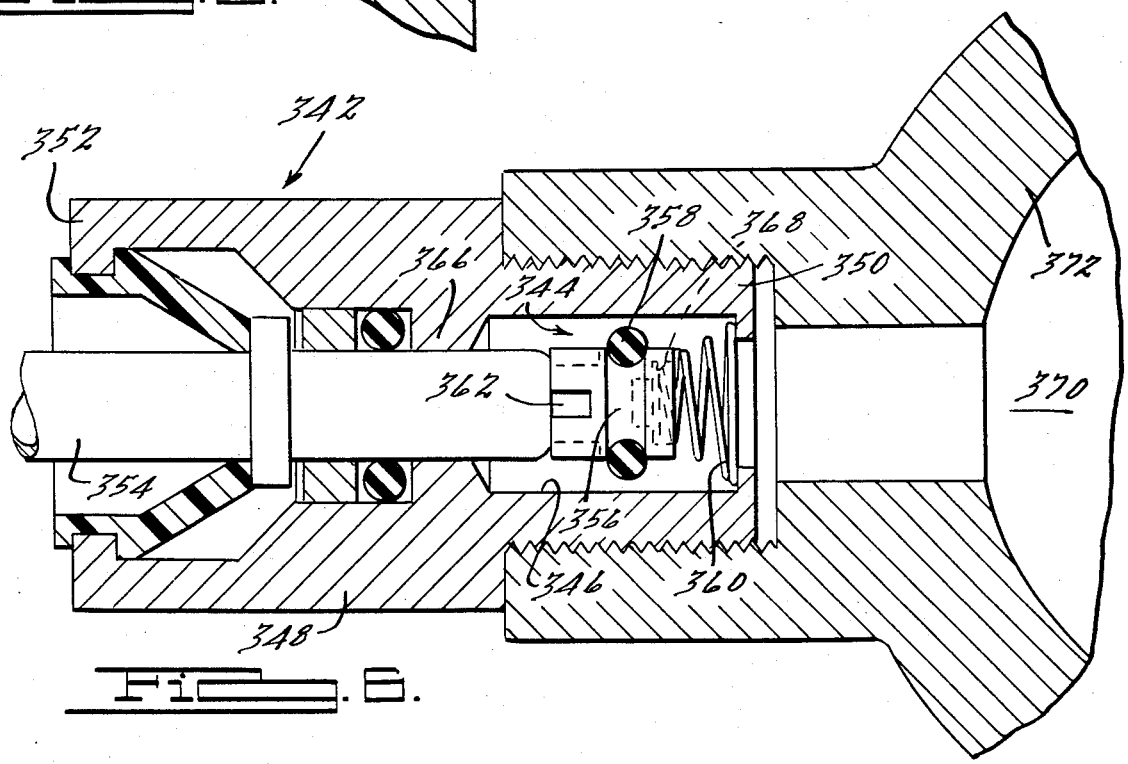
FIG. 6 is a side elevation view, partially in cross-section, of a connector assembly including a check valve unit and shown with the tubular conduit in its operative position within the axial bore of the housing.
Figure 7:
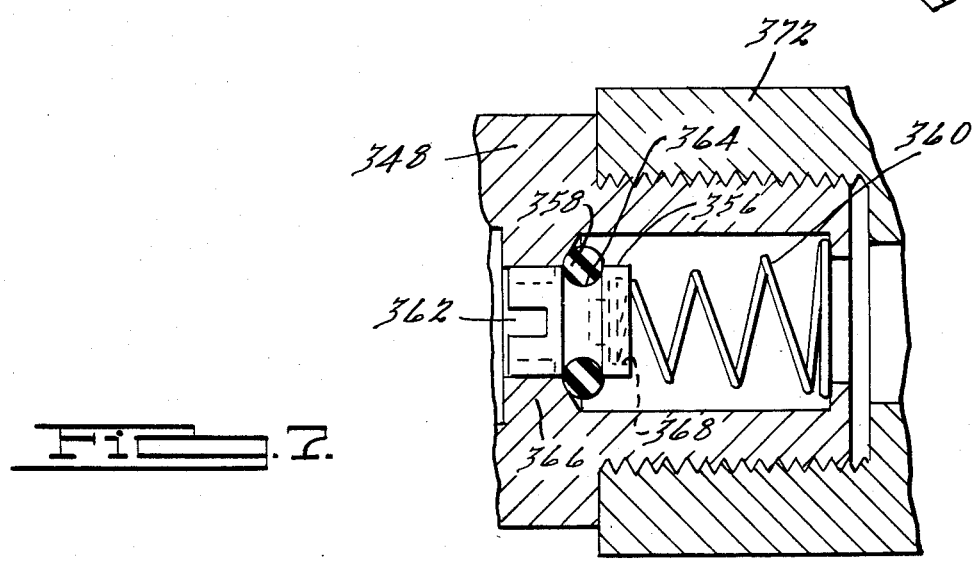
FIG. 7 is an enlarged side elevation view, partially in cross-section, of the connector assembly illustrated in FIG. 6, particularly showing the check valve unit when the tubular conduit is not in its operative position within the axial bore of the housing.

Referring to FIG. 6, a side elevation view of a connector assembly 342 is shown partially in cross-section. The connector assembly 342 features a check valve unit 344, which is disposed in an axial bore 346 of a housing 348. The check valve unit 344 operates to block the flow of fluid from a second end 350 of the housing 348 to a first end 352 of the housing when the conduit 354 is not in its operative position within the axial bore 346 of the housing. It should be noted that FIG. 6 illustrates the connector assembly with the conduit 354 in its operative position, while FIG. 7 illustrates an enlarged portion of the connector assembly where the conduit is not in its operative position. When the conduit 354 is in its operative position, the check valve unit 344 also operates to permit the flow of fluid between the first end 352 and the second end 350 of the housing 348. Before proceeding to describe the check valve unit 344, it may be worthy to note that it may be used with a variety of retainer elements, and the particular retainer element illustrated in FIG. 6 (similar to that of FIG. 13 of U.S. Pat. No. 4,423,892) is intended for exemplification only.

The check valve unit 344 generally comprises a valve body 356, an elastomeric ring 358, and a helical compression spring 360. The valve body 356 is formed with a plurality of generally axially extending, circumferentially spaced passageways or notches 362 for selectively permitting fluid to flow to or from the conduit 354. The elastomeric ring 358 is seated in an annular groove 364 of the valve body 356 such that when the conduit 354 is not in its operative position within the axial bore 346 of the housing 348, the elastomeric ring is in sealing engagement with a neck portion 366 of the housing. Accordingly, the elastomeric ring 358 is associated with the valve body 356 such that it is operative to block the flow of fluid from the second end 350 of the housing 348 through the passageways 362 in the valve body when the conduit 354 is not in its operative position within the axial bore 346 of the housing. The helical compression spring 360 is adapted to have one end seated in a circular groove 368 of the valve body and the other end in engagement with the housing 348 (generally at the second end 350 thereof). The spring 300 operates to resiliently urge the valve body 356 in to a nesting relationship with the housing 348 (as shown in FIG. 7) when the conduit 354 is not in its operative position, thereby causing the elastomeric ring to block fluid flow. However, the spring 360 also operates to permit the valve body 356 to be displaced axially from the nesting relationship by yieldably resisting the insertion of the conduit into the axial bore 346 of the housing, thereby permitting fluid flow through the passageways 362 in the valve body when the conduit is in its operative position within the axial bore of the housing. It should be noted that the provision of the check valve unit 344 in connector assembly 342 will permit an area 370 in a device 372 to be charged with a fluid before the device is shipped in an application where the conduit 354 is to be connected after shipment of the device.

Referring to FIG. 8, a perspective view of a stuffer-plug 374 according to the present invention is shown. The stuffer-plug 374 is intended to be disposable and is preferably made from a plastic material. The stuffer-plug 374 serves three principal functions, which may best be illustrated with reference to FIG. 9. Briefly, the stuffer-plug 374 is used to install one or more sealing elements in the axial bore of a housing and detachably secure a retainer element to the housing. The stuffer-plug 374 also serves to seal the axial bore of the housing.

FIG. 9 is a side elevation view of the stuffer-plug 374, partially in cross-section, shown to be disposed in a housing 376 (in phantom lines). The stuffer-plug 374 is comprised of a body which is formed with a rod-shaped portion 378 and a facing portion 380 extending generally from one end of the rod-shaped portion. The rod-shaped portion is adapted to support sealing elements 382 and 384, and a retainer element 386 in a generally coaxial assembly relationship thereon. The rod-shaped portion 378 may also be used to support a sleeve 388 and a bushing 390 in the appropriate application. The rod-shaped portion 378 is also adapted to be inserted into an axial bore 392 of the housing 376 and preferably has an outer diameter generally corresponding to that of the conduit to be connected to the housing. The rod-shaped portion may be either a solid rod or tubular in construction, provided that the tube is closed at some point in order to seal the axial bore 392.

The facing portion 380 of the stuffer-plug body is adapted to cover or substantially cover the axial bore 392 of the housing 376 at a first end 394 thereof. In one form of the present invention, the facing portion 380 is a circular plate extending generally transversely from the rod-shaped portion 378, and the facing portion is formed with a generally axially extending tab 396 for facilitating the removal of the stuffer-plug 374 from the axial bore 392 of the housing 372. The rod-shaped portion 378 is also formed with two annular grooves 398 and 400 which seat the elastomeric ring sealing elements 382 and 384 respectively. The annular grooves 398 and 400 provide positioning means for maintaining the sealing elements 382 and 384 and the retainer element 386 in the assembly relationship on the stuffer-plug body until the stuffer-plug body is removed from the axial bore 392 of the housing 376. The annular grooves 398 and 400 operate to prevent the sealing and retainer elements from slipping off the stuffer-plug body before the rod-shaped portion 378 is inserted into the axial bore 392 of the housing, and yet also permits the sealing and retainer elements to slide off the rod-shaped portion when the stuffer-plug body is removed from the housing. It should be noted that it may only be necessary to provide for one annular groove in the rod-shaped portion 378, or provide for one or more annular projections instead of the annular grooves in the appropriate application. The rod-shaped portion 378 may also include an annular projection 402 formed with an inclined surface 404 for cooperating with the retainer element 386 to prevent the retainer element from slipping off the stuffer-plug body before the rod-shaped portion is inserted into the axial bore of the housing. The inclined surface 404 operates to facilitate the removal of the stuffer-plug body from the axial bore 392 of the housing 376 by causing a gradual outward deflection of the retainer element leg members as the stuffer-plug body is pulled out of the axial bore until the inwardly opening channel portion 406 of the retainer element leg members clears the annular projection 402.

The sealing elements 382–384 and the retainer element 386 are preferably disposed on the rod-shaped portion 378 in the assembly relationship such that one end of the retainer element is positioned adjacent to the facing portion 380 and the sealing elements 382–384 are positioned adjacent to the opposite end of the retainer element. Accordingly, the facing portion 380 will provide a blocking surface 408 upon which the retainer element 386 is adapted to bear against when the stuffer-plug body is inserted into the axial bore 392 of the housing. Thus, when the rod-shaped portion 378 is inserted into the axial bore 392 of the housing 376, the sealing elements 382-384 and the retainer element 386 will be carried with the rod-shaped portion until the retainer element is detachably secured to the housing. The front edge of projection 402 may serve this function allowing easier flexing of the retainer arms during insertion of the assembly into housing 376. It should be appreciated that once the rod-shaped portion 378 is in its operative position within the axial bore 392 of the housing (as shown in FIG. 9), the sealing elements 382-384 will operate to provide a fluid tight seal between confronting portions of the rod-shaped portion and the housing. In this position, the housing 376 or the device to which the housing is mounted is prepared for shipment and subsequent connection to a conduit. Additionally, in order to connect the conduit to the housing 376, the operator simply withdraws the stuffer-plug 374 from the housing and inserts the conduit in its place. Until that time, the stuffer-plug 374 will seal the axial bore 392 of the housing 376 from dirt or other environmental contamination.

It should be noted that with the sealing elements 382-384 and the retainer element 386 is disposed on the rod-shaped portion of the stuffer-plug body in an assembled relationship, this combination of components forms a preassembled stuffer-plug unit for insertion into the axial bore of a housing. It may also be pointed out with reference to FIG. 9 that the housing 376 is not provided with external threads at the second end 410 thereof. This is to illustrate that the housing 376 may form part of an integral cast body, such as an engine block for example.

Referring to FIG. 10, a side elevation view of a preassembled connector conduit unit 412 is shown, partially in cross-section. The connector conduit unit 412 generally comprises a tubular conduit 414, a retainer element 416 and one or more sealing elements 418 and 420. The retainer element 416 is disposed on the conduit 414 in association with an annular projection 422 of the conduit such that the retainer element is fixed or substantially fixed from axial movement in relation to the conduit. The sealing elements 418-420 are disposed on the conduit 414 between an end 424 of the conduit to be connected and the retainer element 416. A sleeve 426 and a bushing 428 may also be disposed on the conduit (as illustrated) in the appropriate application. The connector conduit unit 412 is also shown to include a removable, disposable cover 430 adapted to encompass at least the end 424 of the conduit to be connected. In one form of the present invention, the cover 430 is constructed from an elastomeric material and is adapted to encompass the sealing elements 418-420 and a portion of the retainer element 416. The cover 430 serves to protect the end 424 of the conduit to be connected and the sealing elements 418-420 from dirt or other environment contamination before the connector conduit unit 412 is inserted in the axial bore of a housing. The cover 430 shoud be resilient and flexible, and have an aperture 432 formed therein for permitting the cover body to pass over the end 424 of the conduit to be connected and the sealing elements 418-420. The cover 430 may be subsequently removed and disposed of when the conduit 414 is to be inserted into an axial bore of a housing. When the conduit 414 is inserted into an axial bore of a housing to unite the conduit to the housing, it should be noted that this one-step action will concommitantly install the sealing elements 418-420 in the axial bore of the housing and detachably secure the retainer element 416 to the housing.

Referring to FIG. 11, a fractional side elevation view of a connector assembly 434, partially in cross-section, is shown. Connector assembly 434 features a resilient, flexible U-cup sealing element 436 disposed within an axial bore 438 of the connector housing 440. Accordingly, FIG. 11 serves to illustrate that various types of conventional sealing elements may be employed, including X-section and box-section sealing elements.

Referring to FIG. 12, a side elevation view of an elbow connector assembly 442 is shown, partially in cross-section. FIG. 12 serves to illustrate that a bend (approximately 90 degrees) in a tubular conduit 444 will permit a connector assembly as previously described to form an elbow connector assembly as previously described and eliminate the need for a separate elbow connector. FIG. 12 also serves to illustrate that without the conduit 444, the remaining components of the connector assembly 442 provide a pre-assembled connector conduit unit. In other words, with the sealing elements 446-448, the sleeve 450 and the bushing 451 disposed in the axial bore 452 of the connector housing 454, and the retainer element 456 detachably secured to the housing, then the conduit 444 may be united to the housing in a one-step snapping connection. FIG. 12 further serves to illustrate that the axial bore 452 of the housing 454 may be sloped in the appropriate application.

Referring to FIG. 13, a perspective view of an apparatus 458 for manufacturing the retainer elements of the type illustrated in FIGS. 1-4, 9-10 and 12 is shown. The apparatus 458 has been simplified for illustrative purposes, and includes a frame structure 460 and a pair of vertically movable opposing dies 462 and 464. The apparatus is an injection molding machine for manufacturing a plurality of plastic retainer elements simultaneously. FIG. 14 is a fractional front elevation view, partially in cross-section, of a portion 466 of the apparatus 458. FIG. 14 particularly illustrates the relationship of the dies 462-464 to the leg members 467, 468 and 470 of one of the retainer elements being molded. It is important to note that the edge 472 of leg member 468 and the edge 474 of leg member 470 are formed along the junction of dies 462 and 464. This feature or particular design of the retainer element permits the use of a two-die injection molding apparatus instead of a three-die injection molding apparatus, and consequently allows several retainer elements to be molded at the same time in one apparatus. It should be noted that the shape or angle of the other edges of the retainer element leg members and the separation between the leg members is a matter of design choice, so long as two of the leg members may be formed within a single die and the leg members will not be locked into the dies after they are formed.

As may be best illustrated with reference to FIG. 15, the retainer element 476 is molded around a core body 478 which is inserted into a suitable cavity between the dies 462 and 464. The core body 478 has a shape which conforms to the desired interior shape and dimensions of the retainer element 476, while the cavities of the dies 462 and 464 have a shape which corresponds to the desired exterior shape and dimensions of the retainer element. After the plastic has been injected and sufficiently hardened, the dies 462 and 464 open and an ejector member 480 of the apparatus is translated axially in the direction of the arrows to urge the outward deflection of the leg members 467-470, such that the retainer element 476 may be readily removed from the apparatus 458.

Referring to FIG. 16, a perspective view of another retainer element 482 is shown. In the embodiment illustrated, retainer element 482 is preferably manufactured from a metal material. The retainer element 482 features a split ring body 484, having an opening or slot 486 for facilitating the removal of the retainer element after it has been attached to a housing. The retainer element 482 also features a pair of spring tabs 488 and 490 extending from one end of the opposing jaw members 492 and 494 respectively.

Referring to FIG. 17, a perspective view of a tool 496 is shown which may be used to assist the disconnection of a tubular conduit from a connector housing. The tool 496 comprises a body having a trough-shaped portion 498 and a generally circular-shaped gripping portion 500. The trough-shaped portion 498 is adapted to wrap around or overlie a conduit, and it preferably has a thickness corresponding to the radial height of the annular projection for the conduit. The gripping portion 500 includes a suitable aperture 502 to permit the trough-shaped portion 498 to come into generally continuous engagement with the conduit along its length. It should be noted that the shape of the gripping portion 500 need not be circular, but may be varied provided a sufficient surface is available upon which the necessary axial force may be brought to bear on the trough-shaped section in order to urge the outward deflection of the retainer element leg members or jaws to the point where the conduit may be readily withdrawn from the axial bore of the housing. It should also be appreciated that the cross-sectional span of the trough-shaped portion 498 should be sufficiently circular to engage all of the retainer element leg members or jaws, and yet also permit the trough-shaped portion to be fitted over the conduit. It may also be noted that other tools may be developed for releasing the conduit and/or the retainer element from the housing, such as triangular-acting pliers which engage the retainer element leg members at the finger portions and cause them to be deflected inwardly sufficiently to detach the retainer element from the housing.

Referring to FIG. 18, a side elevation view of another connector assembly 504 is shown, partially in cross-section. The connector assembly 504 features a retainer element 506 which is similar to the retainer element 316 of FIGS. 3 and 4. In FIG. 18, the retainer element 506 is shown in its operative position generally within the axial bore 508 of the connector housing 510. However, retainer element 506 is also adapted to be disposed in a partially installed position, as illustrated in FIG. 19. In the partially installed postion, the retainer element 506 will engage the annular lip 512 of the housing between the inwardly opening channel portion 514 and the outwardly opening channel portion 516 of the retainer element. Accordingly, it should be appreciated that this engagement will operate to maintain the retainer element 506 in this position until the conduit 518 is to be inserted into the axial bore 508 of the housing 510. It should be noted that as the conduit is inserted into the axial bore 508 of the housing 510, the annular projection 520 passes freely into the inwardly opening channel portion 514, and the operator should be able to visually observe that the annular projection 520 of the conduit has been received into the inwardly opening channel portions 514 of the retainer element leg members. Upon the further insertion of the conduit 518 into the axial bore 508 of the housing 510, the retainer element 506 will be carried with the conduit until the annular lip 512 of the housing snaps into the outwardly opening channel portions of the retainer element leg members. Although each of the leg members of the retainer element 506 is provided with a finger portion 522 extending out of the axial bore 508, this feature of the retainer element may be deleted such that once the conduit 518 is in its operative position within the axial bore the retainer element will be flush with the first end 524 of the housing and the retainer element will not be visible from the side of the connector assembly. Accordingly, this modification of the retainer element 506 will provide the operator with a visible indication that the conduit is in its operative position and the assembly is complete.

The connector assembly 504 is also provided with a filter or screen 525 which serves to filter particular matter from the fluid flowing through the bore of the connector assembly. The filter 525 is disposed in a reduced diameter portion 526 of the bore 508, and is adapted to be interposed between the end of the conduit 518 to be connected and a shoulder 527 of the housing 510. The filter 525 may be made from any suitable material, such as metal wire or plastic mesh. It should be understood that the provision of the filter 525 is not limited to the connector assembly 504, and the filter may be employed in other suitable connector housings.

Referring to FIG. 20, a cross-sectional view of an incomplete connector assembly 528 is shown (the sealing elements and conduit not being illustrated). The connector assembly 528 includes a retainer element 529 detachably secured to a housing 530 at a first end 532 thereof. The housing includes a pair of opposing rectangular apertures 534 and 536 through which a pair of outwardly extending portions 538 and 540 of the retainer element 529 extend to secure the retainer element to the housing. The shape of the apertures may be best illustrated with reference to FIG. 21, which particularly illustrates aperture 534. Another feature of the connector assembly 528 is the connection of the housing 530 to an expanded section 541 of a tubular conduit 542, generally at the second end 544 of the housing. It should be noted that the conduit 542 may also be a sleeve which is conventionally connected to a tubular conduit. Additionally, the housing 530 and the conduit 542 may be either made from metal or plastic, and the second end 544 of the housing 530 may be adapted to either snap over or be threaded over the expanded section 541 of the conduit 542. The expanded section 541 of the conduit 542 is also formed with an outwardly extending annular flange 546 which cooperates with a neck portion 548 of the housing 530 to secure the conduit 542 to the housing. It should be noted that if the retainer of FIG. 36 is used, the flange portions from which the arms extend will serve to provide the same function as neck portion 548. Chamfer 547 serves to lead the seals into expanded section 541 to prevent cutting the seal.

Referring to FIG. 22, a perspective view of a connector seal and conduit retainer 550 with dual integral retainer means is shown. This combination retainer is used in the housings of FIG. 11 of U.S. Pat. No. 4,423,892 and FIGS. 1, 2, 6, 12, 18-21, and 23. The retaining means is provided by a pair of opposing, inwardly converging jaw members 552 and 554. The jaw members 552 and 554 may be formed concomitantly with the flanged seal retaining portion 553 in the same molding process or they may be fixedly secured or otherwise attached to the retainer 550 such as by a suitable adhesive. The converging ends 556 and 558 of the jaw members 552 and 554, respectively, are shaped to conform to the outer diameter of the conduit to be connected by the retainer 550. In one form of the invention, the diverging ends 560 and 562 of the jaw members 552 and 554, respectively, extend radially beyond the outer diameter of the retainer 550. These projections provide the same function as the following: the recessed ring 206 of FIGS. 11 and 12 of U.S. Pat. No. 4,423,892, the rear surfaces of jaws 224 and 226 that project outwardly from ring 222 in FIG. 13 of U.S. Pat. No. 4,423,892, the outwardly opening channel 296 engaging the inwardly projecting lip 298 of FIG. 2, the portions 488 and 490 of FIG. 16, or 538 and 540 of FIG. 20 which engages an inwardly projecting lip or the rear of the openings 534 of FIG. 21. However, it should be understood that the shape and number of the leg members may be varied in the appropriate application. It should also be noted that the retainer 550 is also formed with at least one, generally axially extending recess formed by leg members 551 for facilitating flexing of the legs 551. Bushing portion 553, shown with flanged areas 555, provides the function of collar or bushing 451 in FIG. 12, 324 in FIG. 3, 306 in FIG. 1 and bushing 192 of FIG. 11 of U.S. Pat. No. 4,423,892. The hatched area prevents the seals from being ejected by the confined pressure and provides the proper confinement of the seal. Flanged area 555 also serves to prevent the combination retainer 550 from being pushed too far into the housing bores.

Yet another embodiment of a retainer member for a quick connection retainer element is shown with reference to FIGS. 23 and 24 and is generally designated by reference character 570. Retainer element 570 is formed from two separate components, latch member 572 and collar member 574. The latch member, which is preferably constructed from flat sheet metal stock, includes two deflectable leg members, 576 and 578, inter-connected by split annular ring portion 580. Ring portion 580 forms in internal partially circular aperture 604. Each of legs 576 and 578 include radially inwardly directed engaging tab portions, 582 and 584. Further, each of the engaging tabs features outwardly radially projecting side flange surfaces, 586(a) through (d). Each of the leg members, 576 and 578 further includes terminal leg portions 588 and 590, which each further from outwardly radially projecting flange surfaces, 592(a) through (d). This configuration for latch member 572 permits it to be constructed from a single flat piece of sheet metal stock by diecutting and by employing the appropriate metal bending techniques to form the configuration described. Conduit 596 forms annular projection 598 spaced a predetermined distance from conduit end 597, as described in connection with previously discussed embodiments.

Collar member 574 is preferably formed from a polymeric material and forms internal bore 594 having a diameter slightly larger than the outside diameter of conduit 596 and less than the outer diameter of annular projection 598. Collar member 574 further features radially outwardly extending flange portion 600 similar to 555 of FIG. 12. Collar 574 and latch 572 are assembled by inserting collar outside diameter portion 602 through circular aperture 604 of ring member 580. As collar member 574 is inserted within aperture 604, flange portion 600 interferes with tabs 582 and 584 until the tabs are deflected radially outwardly and flange 600 is moved past them thus latching collar member 574 into position between the tabs and the ring member. With reference to FIG. 23, the longitudinal spacing between the inwardly projecting edge, 606 and 608 of tabs 582 and 584 respectively, and ring number 580 is shown providing a slight clearance. This clearance is sufficient to provide engagement with annular projection 598 when conduit 596 is installed. Retainer element 570 is most advantageously employed in conjunction with a housing member 609, having a configuration equivalent to that illustrated by FIG. 2 with inward projecting lip 298, or that shown by FIG. 21 where apertures 534 serve to provide the functions of the inwardly projecting flange 616. Housing member 609 includes internal bore 610, first diameter section 612 and second diameter section 613. At the first end 614 of housing 608 is inwardly radially projecting flange 616. Housing member 609 further forms a third internal diameter portion, 618, having an internal diameter intermediate that of sections 612 and 613.

With particular reference to FIG. 23, retainer element 570 is depicted engaged within housing 609 with conduit 596 installed in its final position within the housing. Prior to installation of the conduit, retainer element 570 is installed within housing member 609. The retainer element is trapped in position within the housing due to engagement between edges formed by flanges 586(a) through (d) and 592(a) through (d) with flange 616. Latch member 572 is formed such that legs 576 and 578 assume a free position such that the legs are further apart than when the latch is installed within housing 609. This configuration provides a slight radially outward bias for the legs thereby preventing inadvertent disconnection of the components during service. Protruding flange surfaces 592(a) through (d) further provide a convenient means for manipulating retainer 570, particularly useful when the retainer is being installed within housing 609. Otherwise, this embodiment operates as described in connection with the embodiment depicted by FIG. 15 and 16, except annular projection 598 is directly abutted against the bushing or collar portion 574, and the deformable legs are relocated. This configuration has the advantage of placing the elements 582 and 584, which prevent withdrawal of the conduit 582 and 584, the conduit annular projection 598, and the bushing portion 574 which retains seal 618 in a more direct compressive resisting relationship. Since the flexible segments have been relocated, this configuration and the combination retainer of FIG. 22 are better suited to withstand higher pressures. The advantages of this embodiment include enhanced retention of the retainer element within the housing due to the higher strength of the metal latch member as compared with plastic components. Sealing of conduit 596 within housing 608 is accomplished by providing a pair of elastomeric sealing elements, 619 and 620, separated axially by bushing 622. Alternately, sealing could be accomplished by providing only one sealing element which would be trapped between collar member first end 624 and the shoulder formed between internal diameter portions 613 and 618. As an alternative to providing radially inwardly directed flange 616 for engagement with tabs 586(a) through (d), two or more apertures could be formed within the housing.

Another embodiment according to this invention is illustrated with reference to FIG. 25 and is generally designated by reference character 650. This retainer element, like that depicted by FIGS. 23 and 24, is comprised of two separable components, latch member 652 and collar 654. Latch member 652 includes inwardly projecting tabs 656 and 658 and outwardly projecting flange surfaces 657(a) through (d). The configuration of leg members 660 and 662 is identical to that of leg members previously designated 576 and 580 and are interconnected by ring number 659 having circular internal aperture 661. Collar member 654 includes outwardly radially projecting flange 664 and further includes a pair of protruding ramped teeth 666, which are located on the outer diameter surface 672 of collar 654 and are positioned opposite one another. Collar member 654 further includes a pair of axially elongated slots 668 and 670, which permit collar 654 to compress radially whereby the separation of teeth 666 may be varied. The collar member and latch are assembled in the manner described in connection with the previous embodiment. Collar 654 is inserted within ring aperture 661. After snapping past tabs 656 and 658, the ring further is trapped between flange 664 and the teeth 666. The ring becomes positioned in this manner by the slight degree of radial compression of the collar caused when the ring engages the teeth. Once installed, the latch and the collar are firmly assembled, unlike the previously described embodiment wherein latch 572 may move axially with respect to collar 574 until the conduit annular projection 598 becomes engaged. Retainer element 650 is most advantageously employed in connection with a housing having the configuration described with respect to the embodiments depicted by FIGS. 1 and 2 and FIGS. 23 and 24. FIG. 26 shows the collar 654 and latch member 652 in an assembled relationship similar to that of FIG. 25, where teeth 666a form an annular outwardly projecting ramped flange that positions circular ring 659.

While the above description constitutes the preferred embodiments of the present invention, it will be appreciated that the invention is susceptible to modification, variation and change without departing from the proper scope and fair meaning of the accompanying claims.

What is claimed is:

1. A connector assembly for providing a quick connection, comprising:
   a tubular conduit adapted to convey fluid having outwardly projecting annular surface means, formed at a predetermined distance from an end of said conduit to be connected, for providing a blocking wall portion disposed transversely to a central axis of said conduit;
   a housing having axial bore means formed therein for receiving said conduit at a first end and for providing a fluid path at a second end, elastomeric ring means disposed in said bore means for providing a seal between said conduit and said housing,
   retainer means, demountably coupled to said first end of said housing, for cooperating with said blocking wall portion of said annular surface means to resist the disconnection of said conduit from said housing, said retainer means composed of a collar member and a separate latch member, said collar including a central bore permitting said conduit to pass therethrough and an outwardly projecting annular flange, said latch member including two or more extending legs, each of said legs forming radially inwardly extending tabs, said legs jointed together by a ring, said ring having an internal diameter permitting said collar to be installed onto said latch member such that said collar flange becomes trapped between said ring and said tabs.

2. The connector assembly according to claim 1, wherein said bore means provides an enlarged first diameter portion at said first end of said housing, and a reduced second diameter portion at said second end of said housing.

3. The connector assembly according to claim 2, wherein said bore means provides for a third diameter portion interposed between said first and second diameter portions, having a magnitude less than said first diameter portion and greater than said second diameter portion.

4. The connector assembly according to claim 3, wherein said ring means is disposed in said third diameter portion of said bore means.

5. The connector assembly according to claim 4, wherein said ring means is comprised of at least one elastomeric ring having an outer diameter appropriately greater than said third diameter portion of said bore means and an inner diameter appropriately smaller than the outside diameter of said conduit, so that a fluid tight seal is provided between said conduit and said housing.

6. The connector assembly according to claim 5, wherein said ring means is comprised at a first and second elastomeric ring separated by a spacer to provide confinement of said second ring.

7. The connector assembly according to claim 6, further including annular sleeve means disposed in said third portion of said bore means, for separating said elastomeric rings and for radially locating said conduit.

8. The connector assembly according to claim 3, wherein said first end of said housing includes an inwardly extending flange, forming a fourth diameter portion in said bore means, for mounting said retainer means within said housing.

9. The connector assembly according to claim 7, wherein said housing is made from an electrically conducting material, and said sleeve means is made from an electrically non-conducting material.

10. The connector assembly according to claim 3, wherein said predetermined distance of said annular surface means from said conduit end to be connected corresponds approximately to the length of said third diameter portion of said bore means.

11. The connector assembly according to claim 1, wherein said legs inwardly extending tabs feature outwardly extending flanges, said flanges engaging said housing thereby retaining said latch within said housing.

12. The connector assembly according to claim 1, wherein said collar further forms one or more radially outwardly extending teeth, said collar further forming one or more axially extending notches permitting said collar to be radially deflected.

13. The connector assembly according to claim 12, wherein said latch member includes two or more extending legs, each of said legs forming radially inwardly extending tabs, said legs joined together by a ring, said ring having an internal diameter permitting said collar to be installed onto said latch member when said collar is radially inwardly deflecting thereby permitting said collar flange to become trapped between said ring and said teeth.

14. The connector assembly according to claim 1, wherein said outwardly projecting flange cooperates with said housing to limit the axial insertions of said conduit within said housing.

15. The connector assembly according to claim 11, wherein said latch member is attached by two or more deformable arms to said collar creating a combination conduit retainer and sealing means retainer, said latch portion engaging both said conduit and said housing to prevent withdrawal of said conduit, said latch being disengable from said housing, said conduit being demountable by expanding said radially inwardly extending tabs and said collar portion acting to provide an inward positioning stop against said housing, second bore for said retainer and conduit, said collar further acting to centrally locate said conduit within said connector, and providing a means for preventing outward movement of said seal.

16. A connector assembly for providing a snap-action quick connection, comprising:
   a tubular conduit adapted to convey fluid and formed with an annular projection disposed a predetermined distance from the end of said conduit to be connected;
   a housing formed with an axial bore for receiving said conduit at a first end and for providing a fluid path at a second end, said housing including an inwardly extending annular lip at said first end;
   sealing means disposed within said axial bore for providing a fluid tight seal between confronting portions of said conduit and said housing;
   retainer means, disposed generally within said axial bore of said housing and detachably secured to said housing at said first end, for cooperating with said annular projection of said conduit to secure said conduit in its operative position within said axial bore of said housing, said retainer means including a latch having at least two circumferentially shaped resilient deformable leg members extending from a separate collar member at one end thereof, said latch leg members having an outwardly projecting tab portion adapted to engage said housing for securing said retainer means in said housing and an inwardly directed tab portion adapted to engage said annular portion of said conduit for securing said conduit in its operative position within said axial bore of said housing, said collar member being formed with an axially extending portion adjacent said sealing means and an annular flange portion extending radially outwardly from said axially extending portion which is adapted to engage the side of said annular projection of said conduit opposite to the side of said annular projection facing said inwardly directed tab portion of said latch leg members, said annular flange portion being interconnected with said one end of said latch.

17. The connector assembly according to claim 16, wherein said tab portions engage an inwardly extending lip formed by said housing.

18. The connector assembly according to claim 16, wherein said leg members of said retainer means are adapted to deform in response to the insertion of said retainer means into said axial bore of said housing and permit said annular lip of said housing to engage said outwardly projecting tab portion of each of said leg members.

19. The connector assembly according to claim 16, wherein said leg members of said retainer means are adapted to deform in response to the insertion of said conduit into said axial bore of said housing and through said collar member of said retainer means and permit said annular projection of said conduit to snap into a space between said inwardly directed tab portion of said leg members.

20. The connector assembly according to claim 17, wherein said leg members of said retainer means are adapted to be deflected inwardly for disengaging said annular lip of said housing from said outwardly projecting portions of said leg members and permitting said retainer means to be detached from said housing.

21. The connector assembly according to claim 16, wherein the first end of said housing has been rolled over to form said annular lip.

22. A connector assembly for providing a snap-action quick connection, comprising:
   a tubular conduit adapted to convey fluid and formed with an annular projection disposed a predetermined distance from the end of said conduit to be connected;
   a housing formed with an axial bore for receiving said conduit at a first end and for providing a fluid path at a second end, said housing including two or more apertures adjacent said first end;
   sealing means disposed within said axial bore for providing a fluid tight seal between confronting portions of said conduit and said housing;
   retainer means, disposed generally within said axial bore of said housing and detachably secured to said housing at said first end, for cooperating with said annular projection of said conduit to secure said conduit in its operative position within said axial bore of said housing, said retainer means including a latch having two or more circumferentially spaced resilient deformable leg members extending from a separate collar member at one end thereof, said latch leg members having an outwardly projecting tab portion adapted to engage said housing apertures such that said retainer is engaged within said housing unit said tab portions are forced together thereby permitting said retainer to be removed from said housing, said retainer means further having an inwardly directed tab portion adapted to engage said annular projection of said conduit for securing said conduit in its operative position within said axial bore of said housing, said latch leg members being affixed to a ring portion of said latch, and said collar member having a central bore and a radially extending flange, said collar member flange being generally trapped between said ring portion and said inwardly directed tab portion of said latch, and said collar member flange engaging said annular projection of said conduit when said conduit is in its operative position.

23. The connector assembly according to claim 22, wherein said collar further forms one or more protruding projection means such that said ring becomes trapped between said collar flange and said teeth.

24. The connector assembly according to claim 22, wherein said latch is formed from sheet metal stock.

25. The connector assembly according to claim 22, wherein said collar is made from polemeric material.

26. The connector assembly according to claim 23, wherein said collar further forms one or more longitudinal slots thereby permitting radial compression of said collar.

* * * * *

UNITED STATES PATENT AND TRADEMARK OFFICE
CERTIFICATE OF CORRECTION

PATENT NO. : 4,541,658

DATED : September 17, 1985

INVENTOR(S) : Donald D. Bartholomew

It is certified that error appears in the above-identified patent and that said Letters Patent is hereby corrected as shown below:

```
Column  2, line 38, "flanges" should be --flange--.(*)
Column  2, line 56, "is" should be --in--.
Column  3, line 38, "assit" should be --assist--.
Column  6, line 63, "recess" should be --recesses--.
Column  9, line 59, "shoud" should be --should--.
Column  9, line 67, "concommitantly" should be --concomitantly--.
Column 11, line 53, "postion" should be --position--.
Column 12, line 54, "36" should be --22--.
Column 14, line 54, "608" should be --609--.
Column 16, line 23, claim  6, "at" should be --of--.
Column 16, line 60, claim 13, "deflectiing" should be --deflected--.
Column 17, line  5, claim 15, "disengable" should be --disengageable--.
Column 17, line 32, claim 16, "shaped" should be --spaced--.
Column 17, line 39, "portion" should be --projection--.
Column 18, line 60, claim 25, "polemeric" should be --polymeric--.
```

Signed and Sealed this

Twenty-fourth Day of March, 1987

Attest:

DONALD J. QUIGG

Attesting Officer     Commissioner of Patents and Trademarks